(12) United States Patent
Shkolnik et al.

(10) Patent No.: US 11,773,974 B2
(45) Date of Patent: Oct. 3, 2023

(54) COMBINATION PISTON AND PISTON RING FOR REDUCING CREVICE VOLUME

(71) Applicant: LiquidPiston, Inc., Bloomfield, CT (US)

(72) Inventors: Nikolay Shkolnik, West Hartford, CT (US); Alexander Shkolnik, Wilmington, MA (US)

(73) Assignee: LiquidPiston, Inc., Bloomfiled, CT (US)

( * ) Notice: Subject to any disclaimer, the term of this patent is extended or adjusted under 35 U.S.C. 154(b) by 0 days.

(21) Appl. No.: 17/987,971

(22) Filed: Nov. 16, 2022

(65) Prior Publication Data

US 2023/0082408 A1   Mar. 16, 2023

Related U.S. Application Data

(63) Continuation of application No. 17/129,257, filed on Dec. 21, 2020, now abandoned, which is a continuation of application No. 16/082,122, filed as application No. PCT/US2017/021965 on Mar. 10, 2017, now abandoned.

(60) Provisional application No. 62/306,559, filed on Mar. 10, 2016.

(51) Int. Cl.
    *F16J 9/08*    (2006.01)
    *F16J 9/20*    (2006.01)
    *F16J 9/14*    (2006.01)

(52) U.S. Cl.
    CPC . *F16J 9/08* (2013.01); *F16J 9/14* (2013.01); *F16J 9/20* (2013.01)

(58) Field of Classification Search
    CPC .................... F16J 9/08; F16J 9/14; F16J 9/20
    See application file for complete search history.

(56) References Cited

U.S. PATENT DOCUMENTS

| 1,868,075 | A |   | 7/1932 | Reiland et al. |
| 2,048,416 | A |   | 7/1936 | Tucker |
| 2,074,581 | A |   | 3/1937 | Frye |
| 2,367,030 | A |   | 1/1945 | Jessup |
| 3,198,531 | A |   | 8/1965 | Brenneke |
| 3,542,376 | A | * | 11/1970 | Dykehouse ................ F16J 9/00 29/520 |
| 3,645,174 | A |   | 2/1972 | Prasse |
| 4,592,559 | A | * | 6/1986 | Harvey .................... F16J 9/145 277/461 |

(Continued)

OTHER PUBLICATIONS

Muscle Car DIY—"Perfecting the Combustion Process for More Power—Part 11," Retrieved from Internet: https://www.musclecardiy.com/cylinder-heads/perfecting-combustion-process-power-part-11/; 48 pages, Jan. 16, 2015.

*Primary Examiner* — Vishal A Patel
(74) *Attorney, Agent, or Firm* — Sunstein LLP (57) ABSTRACT

Embodiments of a combination piston and piston ring to reduce the volume of a crevice defined between the circumferential wall of a cylinder and a portion of the outer wall of a piston within the cylinder, the portion extending down from the top of the piston. The combination piston and piston ring is configured such that pressurized fluid within the cylinder reliably urges a radial face of the piston ring to sealingly engage the circumferential wall of the cylinder, even as the piston reciprocates within the cylinder.

3 Claims, 6 Drawing Sheets

(56) References Cited

U.S. PATENT DOCUMENTS

| | | | | |
|---|---|---|---|---|
| 5,450,783 A | * | 9/1995 | Binford | F16J 9/20 123/193.6 |
| 6,347,575 B1 | * | 2/2002 | Booher | F16J 9/20 277/491 |
| 8,157,268 B2 | * | 4/2012 | Tomanik | F16J 9/20 277/496 |
| 11,149,547 B2 | | 10/2021 | Shkolnik et al. | |
| 2007/0272078 A1 | | 11/2007 | Yamada et al. | |

* cited by examiner

COMBINATION PISTON AND PISTON RING FOR REDUCING CREVICE VOLUME

PRIORITY

This patent application is a continuation of U.S. patent application Ser. No. 17/129,257 filed Dec. 21, 2020, which is a continuation of U.S. patent application Ser. No. 16/082,122 filed Sep. 4, 2018, which is a U.S. national stage entry under 35 U.S.C. § 371 of International Application No. PCT/US17/021965 filed Mar. 10, 2017, which claims priority from provisional U.S. patent application No. 62/306,559, filed Mar. 10, 2016, entitled, "Piston Ring for Reduction of Crevice Volume" and naming Alexander Shkolnik and Nikolay Shkolnik as inventors. The entire contents of each of these applications are hereby incorporated by reference herein, for all purposes.

TECHNICAL FIELD

The present invention relates to reciprocating piston machines, and more particularly to the top most piston ring of internal combustion engines, compressors and pumps.

BACKGROUND ART

A number of measures are being used to increase the efficiency of modern power plants and reduce the emissions. One known cause of increased emissions and reduced efficiencies is the presence of crevice space in the top land, which exists in piston engines in the space formed between the cylinder, the top piston ring and the piston's top. Any fuel in this crevice region is unlikely to burn, or burns incompletely, resulting in significant emissions from the engine, as well as an increase in fuel consumption. For example, one study showed that reduced crevice volumes translate to improved efficiency and power gains of 6.9-11.7%, and even further gains of up to 40% in engine hydrocarbon emissions ["Crevice volume effect on spark ignition engine efficiency", Smith, Patrick M., Masters Thesis 2013, MIT.]

A piston ring having a 'U' cross section, that is placed flush with or near the top piston face, can significantly reduce the top land crevice space. Such piston rings were described in, for example, U.S. Pat. No. 6,347,575, US publication 2007/0272078-A1 and some others. U-cup shaped piston rings called "Head Land rings" were tested by Sealed Power in 1977 [http://www.musclecardiy.com/cylinder-heads/perfecting-combustion-process-power-part-11/], but were written off due to poor performance at high RPM.

Published US patent application US 2007/0272078-A1 teaches a 'U' type piston ring having an upper and lower leg, wherein the upper leg seals gas, and the lower leg is intended to control oil. However, the space formed between upper and lower bodies of the piston contains the gap for oil scraping and the oil, partially exposed to blow-by gases which are present in all engines at some speeds, will be pressurized by such gases and create force urging the piston ring away from the cylinder walls.

Still another example pertains to U.S. Pat. No. 6,347,575, in which the gas pressure acting upon the inner part of U-cup shaped piston ring does not overcome the pressure on outer peripheral surface of the ring, which is in contact with the cylinder walls at all engine rpm's. This is due to the approximately equal projection areas of these two surfaces onto a cylindrical wall surface.

U.S. Pat. No. 5,450,783 to Binford does not teach the dimensions of, or relative surface areas of, the outer radial surfaces of Binford's rings relative to the surface area of the inner portions of those rings. Moreover, Binford's design requires mechanical force applied to an inner surface of a piston ring by angled features of the piston to urge the piston ring towards the cylinder wall. In addition, at least some of Binford's embodiments include a channel defined between two piston ring legs that extend radially outward from the piston ring's central body to contact the cylinder wall. The two legs will trap pressurized fluid (e.g., gas and/or oil) within the channel, resulting in an inward radial force urging Binford's ring away from the cylinder wall.

SUMMARY OF THE EMBODIMENTS

A first embodiment of a piston ring, for sealing a gap between a circumferential surface of a piston (150) of a reciprocating machine and a wall (111) of a cylinder of the machine within which the piston reciprocates along an axis, includes an upper member (210) configured to reside in a peripheral corner cut-out (153) of the piston, the upper member having (i) a radial contact surface (211) configured to be radially loaded against the cylinder wall (111) during operation of the reciprocating machine, (ii) at least one fluid-pressure receiving surface (212, 213), and (iii) an inner axial contact surface (214) configured to contact a ridge (170) of the piston, when the at least one fluid-pressure receiving surface (212 and 213) is axially loaded by fluid pressure. The radial contact surface and the at least one fluid-pressure receiving surface are shaped so that the fluid pressure causes a net force by which the radial contact surface is urged radially against the cylinder wall and the inner axial contact surface is urged axially against the piston. In some embodiments, the radial contact surface has a parabolic profile.

In some embodiments, the piston ring also includes at least one retaining feature (220, 224, 225) extending from the upper member, and configured to maintain positioning of the upper member during the downward intake stroke of the piston.

In some embodiments, the piston ring includes a lower member (220) having an inner axial contact surface (221) that during downward motion of the piston is configured to contact the ridge of the piston; and a bridge (230) coupling the upper member to the lower member, and spanning an axial distance downwardly from the upper member to the lower member. Some such embodiments also include a secondary seal (206) disposed radially inward from the bridge, so that the secondary seal is configured to be loaded against the piston or the bridge by pressure of any fluid that has blown by the inner axial contact surface.

In another embodiment, a piston ring, for sealing a gap between a circumferential surface of a piston (150) of a reciprocating machine and a wall (111) of a cylinder of the machine within which the piston reciprocates along an axis, includes a circumferential member (210) configured to reside in a peripheral corner cut-out (153) of the piston, the circumferential member having (i) a radial contact surface (211) configured to be radially loaded against the cylinder wall (111) during operation of the reciprocating machine, and (ii) an interior fluid-pressure receiving surface (213). The piston ring also includes a plurality of tabs extending from the circumferential member (210) and configured to engage a corresponding retaining groove (175) in the piston, to constrain the piston ring during downward intake stroke of the piston such that a top surface (212) of the circumferential member remains substantially level with a top surface (151) of the piston.

In one such embodiment, least one tab includes a tooth (225) extending radially inward from the interior fluid-pressure receiving surface (213) and configured to engage the corresponding retaining groove (175). In one such embodiment, at least one tab has an L-shape including a stem (281) extending axially from the circumferential member (210) and a digit (282) extending radially from the stem (281) and configured to interlock with the retaining groove (175).

In one embodiment, least one tab has an inverted T-shape including a stem (296) extending axially from the circumferential member (210) and a crossbar (297) extending circumferentially from the stem (296) and configured to interlock with the retaining groove (175). In such an embodiment, the stem (296) may be configured to extend through a gap (298) in a ridge (170) of the piston.

In another embodiment of a piston ring for sealing a gap between a circumferential surface of a piston (150) of a reciprocating machine and a wall of a cylinder (110) of the machine within which the piston reciprocates along an axis, the piston ring includes means for substantially filling a crevice between a top region of the piston and the wall (111) of the cylinder, and having (i) a radial contact surface (211) configured to be radially loaded against the cylinder wall, and (ii) at least one fluid-pressure receiving surface (212, 213), wherein the radial contact surface and the at least one fluid-pressure receiving surface are shaped so that fluid pressure causes a net force by which the radial contact surface is urged radially against the cylinder wall. The embodiment also includes means for securing the piston ring in a peripheral corner cut-out of the piston.

In some embodiments, a first area of a projection (293) of the at least one fluid-pressure receiving surface (212, 213) onto the wall of the cylinder is greater than a second area of a projection (291) of the radial contact surface (211) onto the wall of the cylinder.

In one embodiment, the means for securing the piston ring in the peripheral corner cut-out of the piston includes a plurality of teeth (225) extending radially inward from the interior fluid-pressure receiving surface (213) and configured to interlock with a retaining groove (401) in the piston. In another embodiment, the means for securing the piston ring in the peripheral corner cut-out of the piston includes a plurality of L-shape tabs, each such tab including: a stem (281) extending axially from the means for substantially filling the crevice; and a digit (282) extending radially inward from the stem (281) and configured to interlock with a retaining groove (175) in the piston. In yet another embodiment, the means for securing the piston ring in the peripheral corner cut-out of the piston includes a plurality of T-shaped tabs, each tab including: a stem (296) extending axially from the means for substantially filling the crevice; and a crossbar (297) extending from the stem (296) and configured to interlock with a retaining groove (175) in the piston.

In yet another embodiment, a piston ring for sealing a gap between a circumferential surface of a piston (150) of a reciprocating machine and a wall (111) of a cylinder of the machine within which the piston reciprocates along an axis includes an upper member (210) configured to reside in a cut-out of the piston, the upper member having: (i) a radial contact surface (211) configured to be radially loaded against the cylinder wall (111) during operation of the reciprocating machine, (ii) at least one fluid-pressure receiving surface (212, 213), and (iii) an inner axial contact surface (214) configured to contact a ridge (170) of the piston, when the at least one fluid-pressure receiving surface (212 and 213) is axially loaded by fluid pressure; as well as a bridge spanning an axial distance downwardly from the upper member; and a secondary seal disposed radially inward from the bridge, wherein the radial contact surface and the at least one fluid-pressure receiving surface are shaped so that the fluid pressure causes a net force by which the radial contact surface is urged radially against the cylinder wall and the inner axial contact surface is urged axially against the piston, and the secondary seal is configured to be loaded against the piston or the bridge by pressure of any fluid that has blown by the inner axial contact surface.

BRIEF DESCRIPTION OF THE DRAWINGS

The foregoing features of embodiments will be more readily understood by reference to the following detailed description, taken with reference to the accompanying drawings, in which.

NOTE: the same numerals on different figures refer to the same elements of design.

DETAILED DESCRIPTION OF SPECIFIC EMBODIMENTS

Figure 1A:
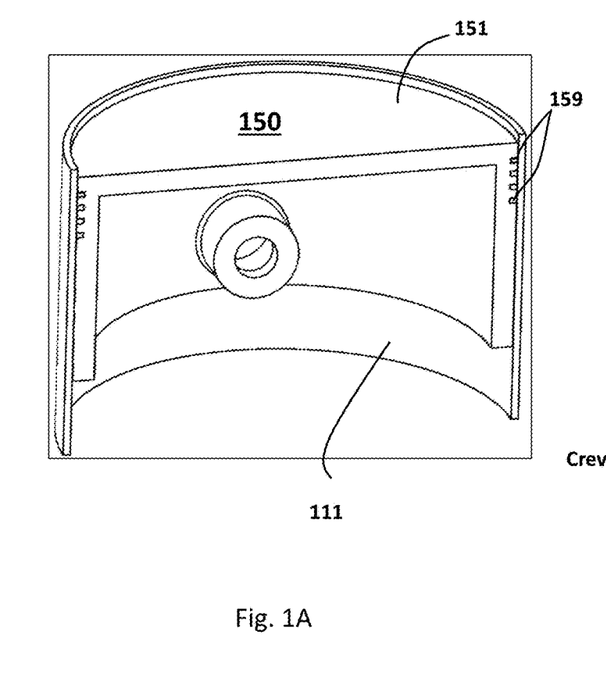
FIG. 1A schematically illustrates a portion of a prior art reciprocating machine with a piston in a cylinder.
Figure 1B:
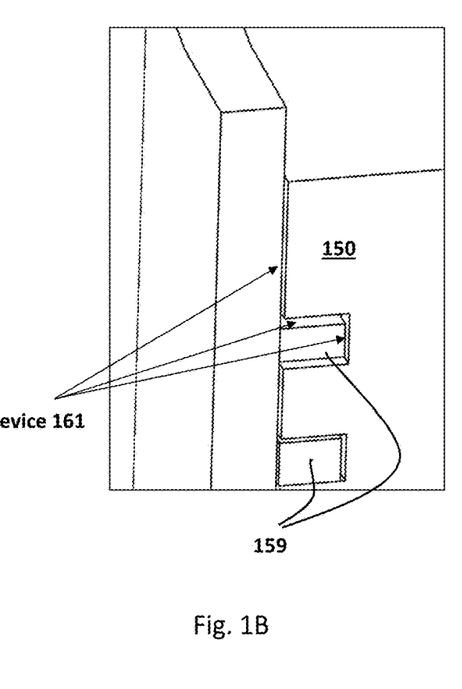
FIG. 1B shows the location of crevices between the piston and the cylinder walls in a prior art reciprocating machine with a piston in a cylinder.

Embodiments of a piston ring reduce the volume of a crevice space, shown in FIG. 1B, defined between the circumferential wall of a cylinder and a portion of the outer wall of a piston within the cylinder, the portion extending down from the top of the piston. The piston ring is configured such that pressurized fluid within the cylinder reliably urges a radial face of the piston ring to sealingly engage the circumferential wall of the cylinder, even as the piston reciprocates within the cylinder.

Definitions. As used in this description and the accompanying claims, the following terms shall have the meanings indicated, unless the context otherwise requires:

A "reciprocating machine" is any one of an internal combustion engine, compressor, expander or a fluid pump, in each case being of the type using a piston that reciprocates in a cylinder.

As used herein, the term "axially" means in a direction along the Z-axis as shown in the figures, and the term "radially" means in a direction along the X-axis as shown in the figures.

Figure 1C:
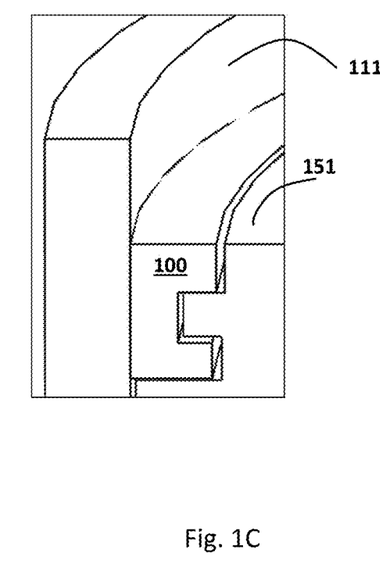
FIG. 1C illustrates a prior art attempt to reduce the crevice volume by utilizing an U-shaped piston ring FIG. 2A schematically illustrates a cut-out view showing a U-cup shaped piston ring in a context of a piston and of a cylinder in accordance with an embodiment of the present invention.

FIG. 1 schematically illustrates a portion of a prior art reciprocating machines having a piston 150 movably disposed within a cylinder's walls 111. As is known in the art, the piston 150 reciprocates axially (i.e., up and down along the Z-axis) within the cylinder. Conventional piston rings 159 seal a gap between the piston 150 and the inner wall 111 of the cylinder, but not near the top region of the piston 150. Consequently, the top piston ring 159 and the top surface 151 of the piston 140 define a crevice 161, certain disadvantages of which are known (e.g., increased emissions and reduced efficiencies; incomplete combustion of fuel within the crevice; increased fuel consumption). A piston ring having a 'U' cross section shape is known in prior art and shown in FIG. 1C and described above. It has not been used in a modern day engines because its performance is not adequate at all loads and operating speeds of the engine. Based on the analysis by the present inventors, the poor performance of prior art rings was the result of a fundamental flaw in the design of such a seal due to, perhaps, poorly understood dynamics of the seal.

Figure 2A:
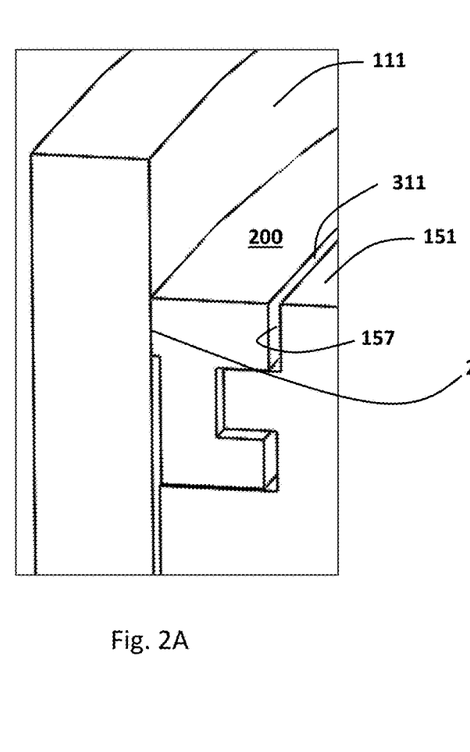
Figure 2C:
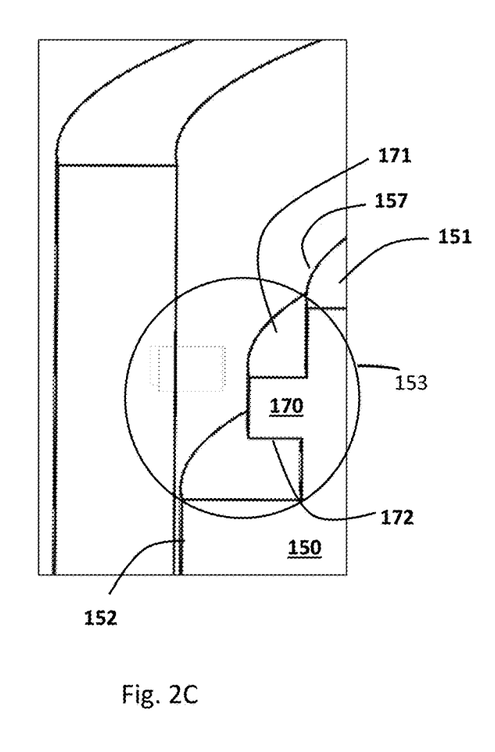
FIG. 2C schematically illustrates a profile views of an embodiment of a cutout in which U-shaped piston ring is placed according to embodiments of the present invention.
Figure 3:
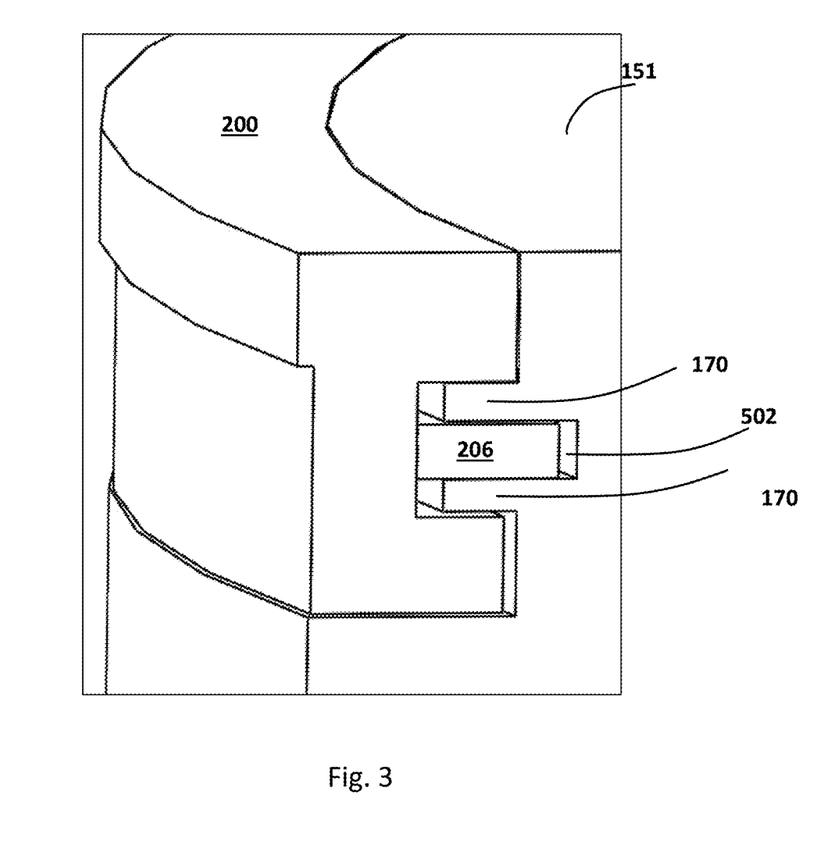
FIG. 3 schematically illustrates an embodiment including a secondary seal to improve the sealing and stability of the primary U-cup shaped piston ring according to embodiments of the present invention.

FIG. 2A schematically illustrates an embodiment of a U-cup shaped piston ring 200 in a context of piston 150 and cylinder wall 111. The piston ring 200 of this embodiment and of the other embodiments described and claimed in this application is for use in a reciprocating machine. The piston ring 200 is positioned within a peripheral corner cut-out 153 of the piston 150 (FIG. 2C) and seals the gap between the circumferential surface of the piston 150 and the cylinder wall 111. The top surface 212 of the piston ring 200 is, and in operation remains, substantially level with a top surface 151. The peripheral corner cut-out 153 (circled in FIG. 2C) is located at the intersection of the top surface 151 and sidewall 152 of the piston 150. In the embodiment of FIG. 2C, the piston 150 has a ridge 170 that juts out in a radial direction toward the piston ring 200 and juts into the peripheral corner cut-out 153. An optional steel ring (not shown), could be placed adjacent to the top 171 of the ridge 170, to prevent wear of the surface 171 of the ridge 170, if such is made out of aluminum. An optional secondary piston ring 206, such as shown in FIG. 3, might be located within a groove in the ridge 170.

The piston ring 200 may be split (not show) just as a conventional piston rings are split, in which case that split may optionally be L-shaped, or have a more complex serpentine shape. The axial split may create or enhance the spring characteristics of the piston ring 200, allowing the piston ring 200 to be placed within the cylinder for installation on the piston 150, but then to urge the radial contact surface 211 radially outward toward the cylinder wall 111.

Figure 2B:
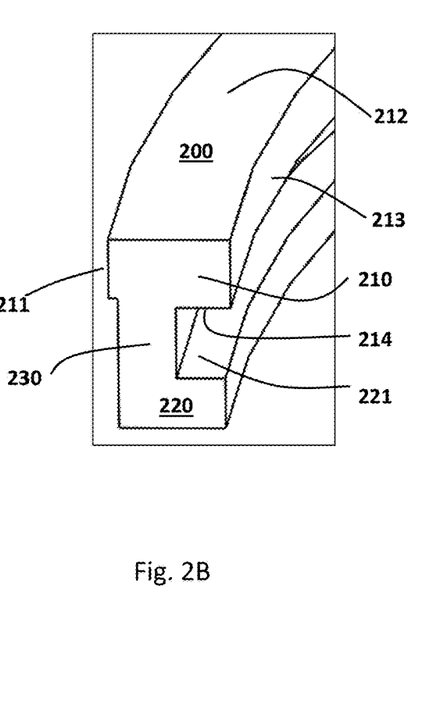
FIG. 2B schematically illustrates a close-up of the cross-section of the U-cup shaped piston ring of FIG. 2A with both the cylinder and the piston removed for clarity.

The cross section of this U-cup piston ring 200 is shown in FIG. 2B, and also in FIG. 2A. The piston ring 200 has an upper member 210, lower member 220 and bridge 230 that connects these two members 210, 220. The radial contact surface 211, which might be barreled or tapered or of any other suitable shape, is in contact with cylinder wall 111 either directly or via an oil film that is typically deposited on the cylinder wall 111 for lubrication purposes. Upper surface 212 and interior surface 213 of upper member 210 are purposefully exposed to high pressure fluid inside the cylinder. The gap 311 (which may be referred to as a fluid receiving gap) between interior surface 213 of the U-cup piston ring 200 and upper radial surface 157 of the piston 150 is the only remaining crevice space; the volume of the gap 311 should be made as small as possible while still allowing for thermal expansion of the piston 150 and the piston ring 200, while also allowing for working fluid (e.g., pressurized gas) to enter into this space. In an internal combustion engine, the working fluid is typically air, which, in a cycle of the machine, is mixed with fuel and the mixture is combusted. During high-pressure strokes (i.e. compression and expansion), the fluid pressure, acting on interior surface 213 (or interior surface 213 and upper surface 212 in combination, if the upper surface 212 is not orthogonal to the reciprocating axis of the piston 150) urges the piston ring 200 outwardly in radial direction (in FIG. 2F, the −X direction) thus eliminating the gap between the piston ring 200 and the cylinder wall 111 and, therefore, the leakage between the piston ring 200 and the cylinder wall 111. The same pressure acting on upper surface 212 pushes the piston ring 200 axially (in FIG. 2F, the −Z direction) downward toward the top surface 171 of the ridge 170 or steel ring, if such is used, eliminating the gap between the piston ring 200 and the piston 150 and, therefore, impeding any leakage between the piston ring 200 and the ridge 170 or steel ring.

If the area of the radial contact surface 211 is too large compared to the area of interior surface 213, the piston ring 200 might lift off the cylinder 110 and sealing will be lost. This can happen for two reasons. First, if portions of the radial contact surface 211 are not in contact with the wall 111 (for example, when the radial contact surface 211 is formed by an upper member that is barrel-shaped or tapered, for example), then some portion of the radial contact surface 211 will be directly exposed to the high pressure fluid, causing an inward force. Second, the lubricating film that collects between the radial contact surface 211 and the cylinder wall 111 is itself exposed from the top to the high pressure fluid, and therefore this fluid layer is pressurized at nearly the same pressure as the working medium, and pushes the piston ring 200 inwardly with the force proportional to the area of the surface 211. So, to ensure that there will be no lift off of the seal from the cylinder, the net radial component of the force resulting from fluid pressure acting upon the piston ring 200 should be in a radially outward direction. FIG. 2F illustrates this for the case when the radial contact surface 211 of the piston ring 200 is axially flat against the cylinder wall 111. (In other words the profile of the radial contact surface 211 is vertically straight, as shown in FIGS. 2A and 2B.) The diagram of forces acting upon the radial contact surface 211, having an area $A_1$ is shown in arrows in the +X direction in FIG. 2F, which may be described as "inward" radial pressure, while a similar diagram of forces acting, in the opposite direction on the area $A_2$, on interior surface 213 is shown in arrows in the −X direction in FIG. 2F, which may be described as "outward" radial pressure. In each case, the length of the arrow in a given location indicates the size of the component of radial force at that location. Even though the radial contact surface 211 is flat against the cylinder wall in this figure, the arrows on the left, corresponding to radial forces acting on radial contact surface 211, are larger near the top of the piston ring 200, as a result of greater pressure in this region resulting from the working medium, as previously discussed. The greater surface area $A_2$ of the interior surface 213 than the surface area of radial contact surface $A_1$ 211 produces a net radial force in the outward direction to urge the radial contact surface 211 against the cylinder wall 111.

Similarly the upper surface 212 of the piston ring 200 receives pressure from the working medium that is much greater than the upward pressure on the lower face opposed to upper surface 212 (and the lower face has a smaller surface area than that of upper surface 212), so that the net downward axial force is also applied to the piston ring 200.

Figure 2D:
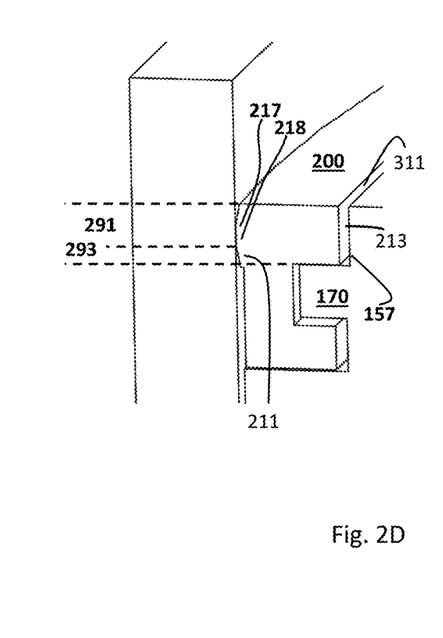
FIG. 2D schematically illustrates a parabolic profile views of an alternate embodiment of a U-shaped piston ring according to embodiments of the present invention.

It is sometimes beneficial to have a curved profile (as shown in FIG. 2D), which may be a parabolic profile, on the running face or radial contact surface 211 to:

Keep the contact force centered even if the seal tilts which also keeps the gas pressure distribution constant as a function of tilt; and/or Reduce friction by promoting hydrodynamic pressure generation; and/or Determine the portion of the running face or radial contact surface 211 exposed to high pressure gas (top ring profiles are asymmetric to reduce friction);

The optional secondary seal could help in preventing of seal twisting.

Figure 2E:
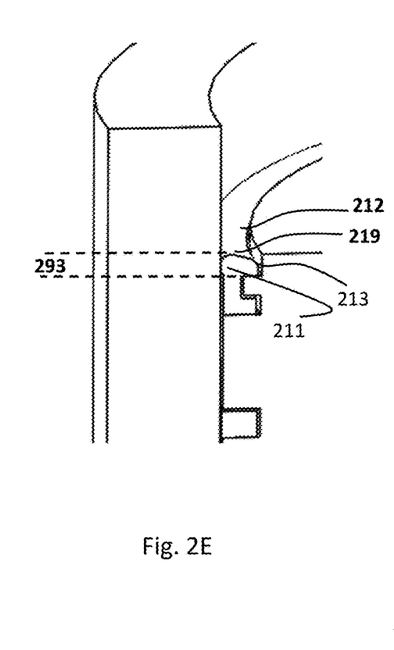
FIG. 2E schematically illustrates an arbitrary shape of pressure receiving surfaces of a U-cup piston ring FIG. 2F schematically illustrates forces acting upon the areas $A_1$ (surface 211) and $A_2$ (surface 213) due to presence of pressurized fluid when the machine is in operation and, more specifically, the direction of the net force urging the piston ring outwardly.
Figure 2F:
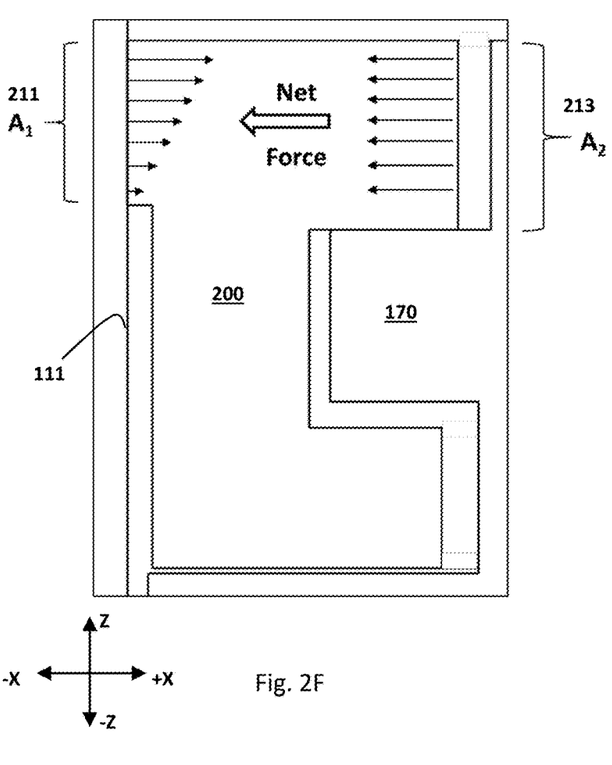

A general case of the shape of the radial contact surface 211 is shown in FIG. 2E as an example, where the radial contact surface 211 has both straight and a curved profile, the upper surface 212 is not orthogonal to the reciprocating axis of the piston 150, and the interior surface 213 is also curved.

The condition of no lift off of the U-cup shaped piston ring 200 is that the net radial force component on the surfaces 211, 212 and 213 that are exposed to high pressure fluid must be directed so as to urge the seal in an outward direction. This condition should hold at any pressure and at any speed, so frictional forces, and blow-by characteristics, which vary upon the engine's load as well as shaft angular velocity must be taken into account. It is therefore a feature of some embodiments that the radial contact surface 211 and any other high pressure fluid receiving surface (namely the upper surface 212 and the interior surface 213) are shaped so that this condition is satisfied.

This condition may be satisfied, for example, when the area of a projection 291 of the portion of the radial contact surface 211 that is exposed to high pressure fluid onto the cylinder wall 111 is less than the area of projection 293 of the pressure-receiving surfaces 212 and 213 onto the cylinder wall. In embodiments in which the radial contact surface 211 is flat, or has a flat contacting region (e.g., the radial surface 211 is curved but has a flat contact area portion when against a cylinder wall, e.g., area 218 and FIG. 2D), it can be assumed that an oil film exists at the contact between the surface 211 and the cylinder wall, and this oil film is pressurized by the cylinder chamber pressure. Therefore in such embodiments, the projection onto the cylinder wall 291 includes the portion (e.g., portion 217 in FIG. 2D) of the radial contact surface 211 that is exposed to high pressure chamber fluid including the area of the contact itself, as is the case in FIG. 2F for example.

The projections of the gas loaded surfaces of the piston ring, including the contact surface with oil film, is a conservative simplification of the actual net forces behaving on the ring. A more complete model of radial forces is shown by the arrows in FIG. 2F, whereby the pressure of the contact surface is shown to diminish. The net force urging the piston ring seal radially against the cylinder is maintained when the radial component of the integral of (Area×Pressure) over the entire piston ring points in the outward (−x) direction, and this is held true when A1<A2 (conservatively), or so long as pressure×area for each portion of surface 211 is less than P×the surface area of the pressure receiving surface 213. Computation fluid dynamic models exist which can computationally model pressure over each portion of the ring, including hydrodynamic pressure at the oil film generated at the contact between the piston ring and the cylinder, and such models can be used to design the seal to meet the required condition for net outward radial force.

In embodiments in which the piston ring 200 has a curved radial surface 211, such as in FIG. 2D for example, the projection of the radial contact surface 211 is defined as the projection 291 of that portion 217 of the radial contact surface 211 that is exposed to the space above the point 218 where the radial contact surface 211 meets the cylinder wall 111.

In embodiments in which the upper surface 212 and the inner pressure receiving radial surface 213 of the piston ring 200 are not orthogonal to one another, for example they form a curve as schematically illustrated in FIG. 2E, the projection of the pressure-receiving surface of the piston ring 200 in gap 311 is defined as the projection 293 of that portion of the upper surface 212 extending downward from the peak 219 of the upper surface 212 to the inner pressure receiving radial surface 213, in addition to the projection of the inner pressure receiving radial surface 213.

It should be noted that the function of lower member 220 of the piston ring 200 is to constrain the piston ring 200 (e.g., via contact been the lower member 220 and the lower surface 172 of the ridge 170) during downward motion of the piston 150 when pressure in cylinder 110 is low, such as during the intake stroke, so that the piston ring 200 remains in the peripheral corner cut-out 153. Consequently, the lower member 220 may be referred to as a retaining feature. The lower member 220 does not have to be continuous over 360 degrees but could be segmented in a form of "tabs" 224, which are protruded from the upper member 210, or the arm bridge 230, of the piston ring 200. As little as three such small tabs may be required to contain the piston ring 200 during the intake stroke—this would result in reduction of ring mass, which is a desirable feature.

Figure 4A:
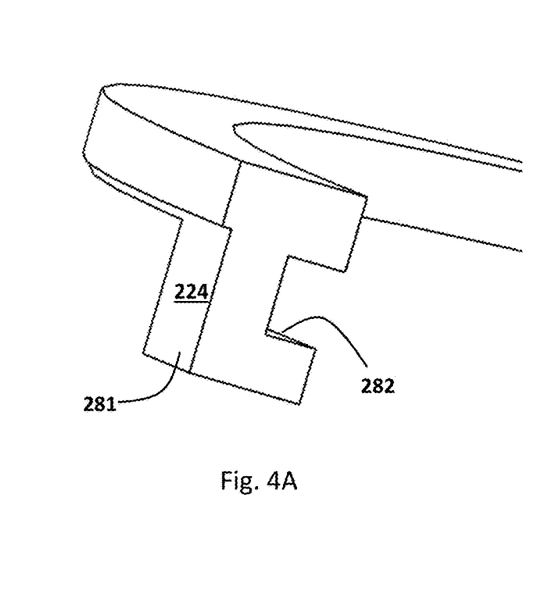
FIGS. 4A-4C schematically illustrate embodiments of piston rings having retaining tabs according to embodiments of the present invention.

For example, in some embodiments, the tab may have an L-shape, as schematically illustrated by tab 224 in FIG. 4A. A digit 282 extends radially inwardly from a stem 281 of the tab 224 and secures the piston ring 200 to the piston 150 by interlocking with radial retaining groove 175.

Figure 4B:
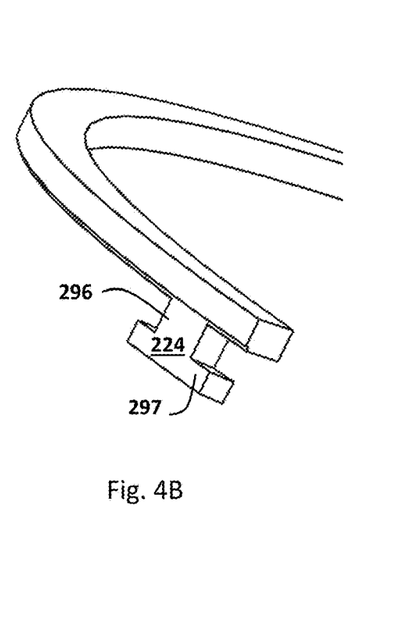
Figure 4C:
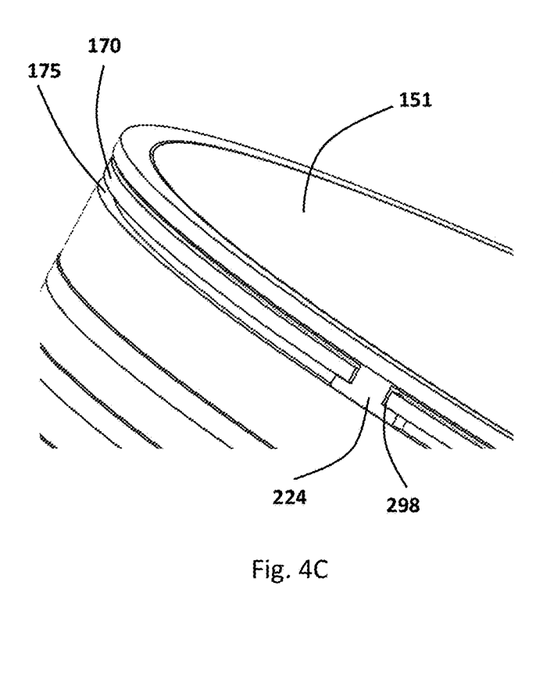

In other embodiments a tab has an inverted "T" shape extending downwardly from the upper member 210 of the piston ring 200, and may be referred to as a "T" retainer 224 (see FIGS. 4B-4C). The stem 296 of the T retainer 295 passes through a gap 298 in ridge 170, such that T-bar 297 nests in radial retaining groove 175. The T-bar 297 may be described as being configured to extend circumferentially around the piston 150.

It should be noted that the function of the tabs 180, 224 is to constrain the piston ring 200 during downward motion of the piston 150 when pressure in cylinder 110 is low, such as during the intake stroke, so that the piston ring 200 remains in the peripheral corner cut-out 153. Consequently, the tabs 224 may each be referred to as a retaining feature.

The piston ring 200 is initially energized due to its own spring-like property, but during the operation it is mostly fluid energized.

Figures 5A, 5B:
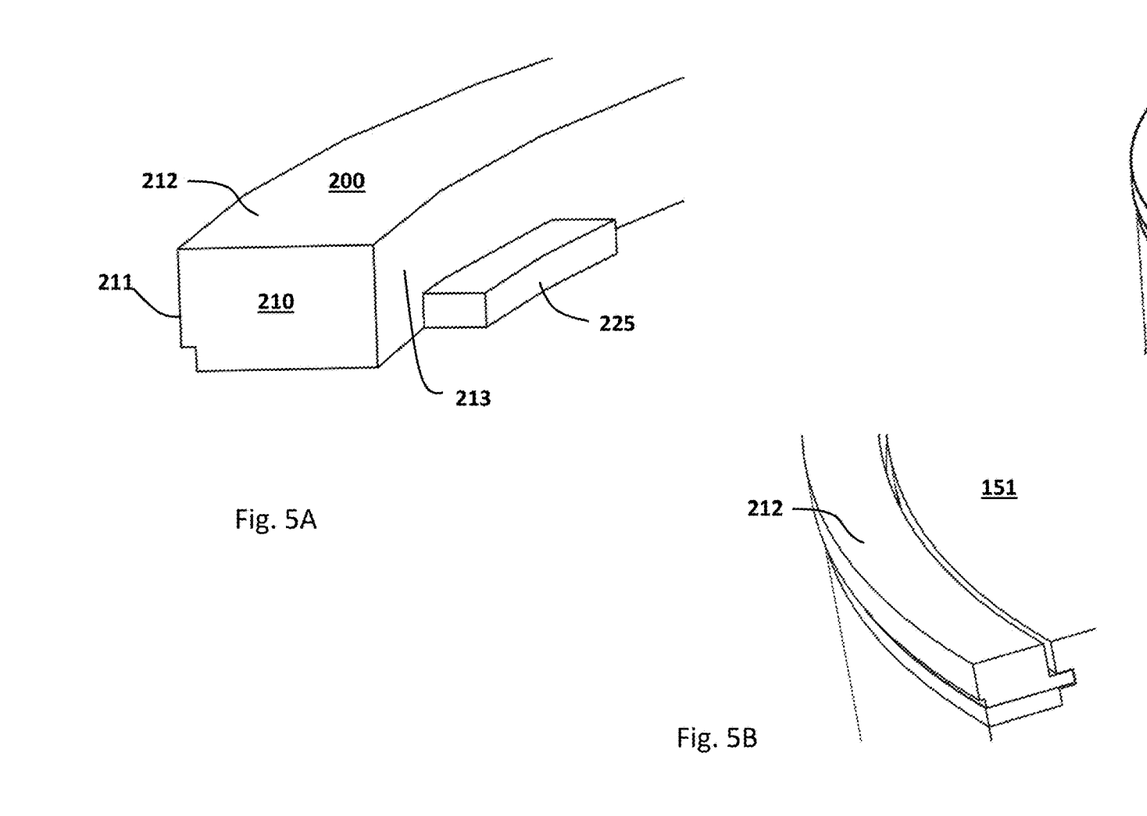
FIGS. 5A-5C schematically illustrate embodiments of a piston ring having tabs directed radially inward according to embodiments of the present invention.
Figure 5C:
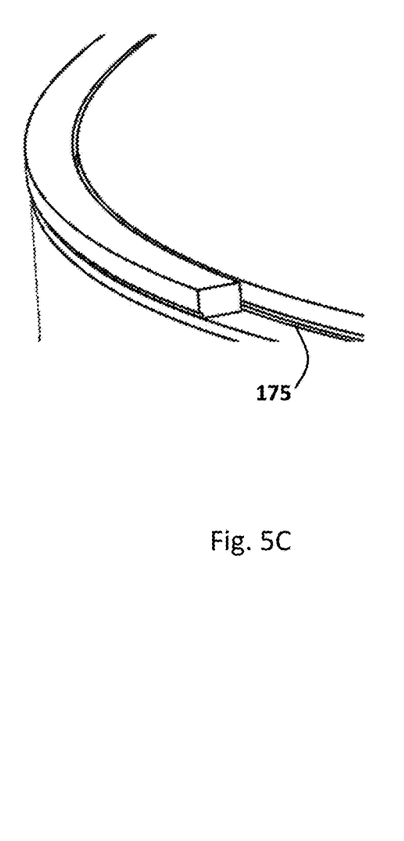

Another embodiment is shown in FIGS. 5A-5C. An upper member 210 is similar to one described in FIG. 2A, but the arm bridge 230 and lower members 220 are eliminated leaving only one or more teeth 225 that extend radially inward from the pressure receiving surface 213 of the upper member 210 to engage with retaining groove 175 in the peripheral corner cut-out 153 (e.g., at or in upper radial surface 157) to constrain the motion of the piston ring 200 during downward stroke so the piston ring 200 remains in the peripheral corner cut-out 153. These tabs could be used as an anti-rotation device, which sometimes is important when valves' cutouts are encroaching onto the upper surface of the piston ring 200. Cutouts still could be made and tabs would keep the piston ring 200 from rotating within the peripheral corner cut-out 153. Furthermore, the gradually sloped cutout in the piston 150 that accommodate the ring's tabs could aid in piston/ring assembly.

Optionally, a secondary piston ring 206, schematically illustrated in FIG. 3, can be used to ensure that any blow-by that might be occurring between the surface 214 of the upper member 210 and the steel ring (or ridge 170, if steel ring is not used) will be mitigate or stopped by this secondary seal 206. In some embodiments, the secondary seal 206 is disposed within a ridge groove 502 of the ridge 170, as schematically illustrated in FIG. 3. The profile of the piston 150 in FIG. 3 is the same as that in FIG. 2C, but includes ridge groove 502. The inclusion of the secondary seal 206 might eliminate the need for a second or third ring (e.g., 159 as shown in FIG. 1A) that are typically installed in the piston 150, thus reducing the friction and also might help to stabilize the primary U-cup piston ring 200 on the cylinder wall 111, reducing twisting.

The following is a listing of reference numbers used above.

| No. | Feature |
| --- | --- |
| 100 | Crevice reduction piston ring (Prior Art) |
| 111 | Cylinder wall |
| 150 | Piston |
| 151 | Top surface of piston |
| 152 | Radial surface of piston |
| 153 | peripheral corner cut-out |
| 157 | Upper radial surface of piston |
| 159 | Conventional piston rings |
| 161 | Crevice |
| 170 | Ridge |
| 171 | Top surface of the ridge |
| 172 | Bottom surface of the ridge |
| 175 | Radial retaining groove |
| 200 | Crevice reduction U-Cup piston ring |
| 206 | Secondary seal |
| 210 | Upper member or circumferential member of piston ring |
| 211 | Radial contact surface of piston ring |
| 212 | Top receiving surface of piston ring |
| 213 | Inner receiving surface of piston ring, or interior fluid-pressure receiving surface |
| 214 | Inner axial surface of piston ring |
| 217 | Portion of a curved radial contact surface exposed above the point where the curved radial contact surface contacts the cylinder wall |
| 218 | Point where a curved radial contact surface contacts the cylinder wall |
| 219 | Peak of curved upper surface |
| 220 | Lower member of piston ring |
| 221 | Inner axial contact surface |

-continued

| No. | Feature |
| --- | --- |
| 225 | Tooth |
| 230 | Arm Bridge member |
| 224 | L-tab, Retaining T |
| 281 | Stem of L-tab |
| 282 | Digit of L-tab |
| 291 | Projection of radial contact surface of piston ring onto cylinder wall |
| 293 | Projection of inner receiving surface of piston ring onto cylinder wall |
| 296 | T-stem |
| 297 | T-bar |
| 298 | T-gap |
| 311 | Fluid receiving gap |

The embodiments described above are intended to be merely exemplary; numerous variations and modifications will be apparent to those skilled in the art. All such variations and modifications are intended to be within the scope of the present disclosure, as defined in any appended claims.

What is claimed is:

1. A cylindrical piston having a piston ring for sealing a gap between a circumferential surface of the piston of a reciprocating machine and a wall of a cylinder of the machine within which the piston reciprocates along an axis between upper and lower limits, to affect fluid pressure in the cylinder, wherein the upper limit is reached by a top surface of the piston with each reciprocation, the piston comprising a circumferentially disposed corner cut-out forming a radially disposed gap between the piston and the cylinder, the gap extending downward from the top surface of the piston, the corner cut-out defining a shelf above which the piston has a reduced diameter;

the piston ring having:

(1) a ring-shaped region and a retaining feature, (i) the piston ring being shaped to reside in the peripheral corner cut-out of the piston, and the radially disposed gap between the piston and the cylinder extends downward from the top surface of the piston by a distance that is at least as large as an axial height of the piston ring; and (ii) the retaining feature being shaped to project into a corresponding groove of the piston; and (2) a top surface exposed to the fluid pressure, a radial contact surface facing the cylinder wall, a radially inward surface, opposite the radial contact surface and exposed to fluid pressure, and an axial surface, directly opposite the top surface of the piston ring, in contact with the shelf during the upward motion of the piston; and wherein:

(a) the top surface of the piston ring, the radial contact surface, and the radially inward surface are shaped so that the fluid pressure causes a net force by which the radial contact surface is urged radially against the cylinder wall and the axial surface is urged axially against the shelf, and (b) the piston ring, in a vertical section thereof, has a U-shaped profile, including an upper member and a lower member and a bridge member connecting the upper and lower members, the U being horizontally disposed so that the bridge member is proximate to the wall of the cylinder, the top surface of the upper member corresponding to the top surface of the piston ring, the lower member corresponding to the retaining feature, the upper and lower members defining a notch therebetween shaped to receive the shelf, (c) the piston ring has a set of circumferentially disposed gaps, each gap extending axially through the bridge member and through the lower member, and (d) the piston contains a recess that lies below the top surface of the piston, and wherein a secondary seal is partially disposed within the recess between the piston and the piston ring, the secondary seal being configured to be loaded against a surface selected from the group consisting of a surface of the piston, a surface of the piston ring, and combinations thereof, by pressure of any fluid between the piston ring and the piston.

2. The combination piston and piston ring according to claim 1, wherein the radial contact surface has a parabolic profile.

3. The combination piston and piston ring according to claim 1, wherein the axial length of the radial contact surface of the piston ring is shorter than the axial length of the piston ring.

\* \* \* \* \*